UNITED STATES PATENT OFFICE.

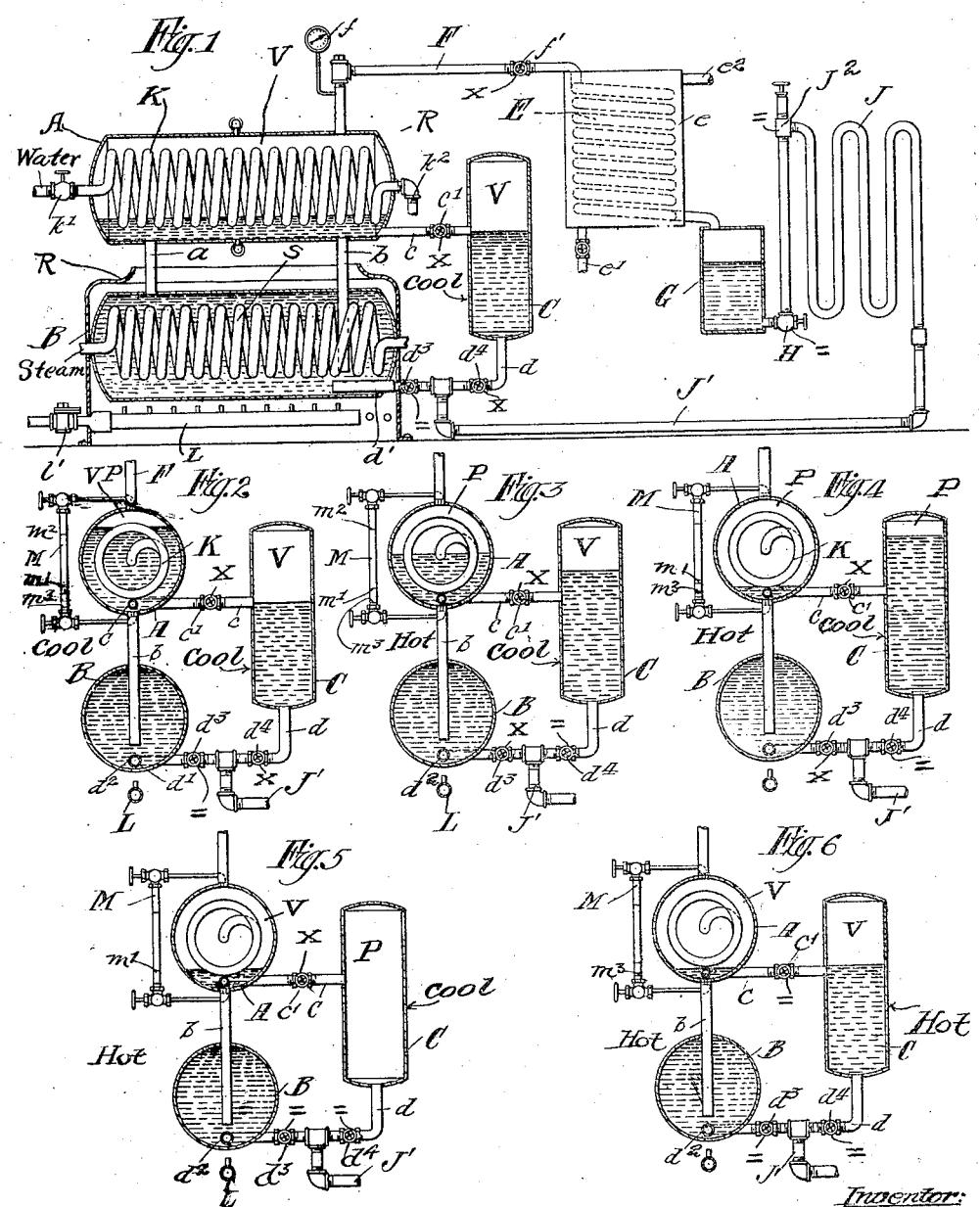

WILLIAM J. KELLY, OF CHICAGO, ILLINOIS, ASSIGNOR TO AUTOVACUUM REFRIGERATING COMPANY, OF NEW ORLEANS, LOUISIANA, A CORPORATION OF LOUISIANA.

REFRIGERATING APPARATUS.

1,122,603.   Specification of Letters Patent.   Patented Dec. 29, 1914.

Continuation of application filed May 26, 1913, Serial No. 770,004. This application filed March 5, 1914. Serial No. 822,632.

*To all whom it may concern:*

Be it known that I, WILLIAM J. KELLY, a citizen of the United States, and a resident of Chicago, Cook county, Illinois, have invented a certain new, useful, and Improved Refrigerating Apparatus, of which the following is a specification.

My invention relates to ammonia absorption refrigerating apparatus and has special reference to improvements upon, and for use with the refrigerating apparatus which is disclosed in the Smith Patent No. 1,038,221, granted September 10, 1912. Such an apparatus or system comprises a container for aqua ammonia, with means for heating it periodically to drive off the ammonia in the form of gas; a condenser for liquefying the gas; a reservoir for the liquid ammonia; and, a refrigerating element or coil wherein the ammonia by expansion performs its refrigerating function. The coil delivers the gas or expansate to the container for re-absorption by the weak aqua ammonia in each cycle remaining from the previous distillation. Suitable valves are included in the system for use during the period of distillation and condensation, and during the period of expansion and re-absorption. In such systems or apparatus, as commonly used, refrigeration is intermittent because re-absorption and distillation cannot proceed simultaneously in a single vessel or container. A suspension of refrigeration may be avoided by the alternate use of two containers, with two bodies of aqua ammonia; but the double cost of apparatus and aqua ammonia is disproportionate to the benefits secured. Further, such systems are limited to the use of anhydrous or substantially anhydrous liquid ammonia. Even four or five per cent. of water in the liquid ammonia makes them inefficient, unreliable and costly, and to exclude water it is necessary to de-hydrate the gas before condensing it, or to rely upon a slow and incomplete distillation at temperatures too low to generate steam, as in the case of the Smith apparatus. Slow distillation means long interruption of refrigeration; and, when distillation is incomplete, very little liquid distillate is secured and frequent distillations are required with as many interruptions of refrigeration.

The general objects of my invention are, to increase the distillation capacity of ammonia absorption refrigerating apparatus; to increase the refrigerating capacity thereof; to shorten the distillation period, during which such apparatus requires the care of an attendant; and, to correspondingly lengthen the main period of absorption; to accomplish continuous refrigeration in a single apparatus and with a single quantity or body of aqua ammonia; and, to provide for the expansion and re-absorption of liquid ammonia containing ten, twenty and even higher percentages of water with as good or better results than generally obtained with anhydrous liquid ammonia.

A still further object of my invention is to simplify and improve the construction and lessen the cost of refrigerating apparatus generally, and particularly apparatus of the kind disclosed in the aforesaid Smith patent.

My invention consists generally in an ammonia absorption refrigerating system having a container which alternately serves as an absorber and as a still, in combination with means for establishing a substantial vacuum over the hot weak liquor when distillation ceases therein, a small auxiliary absorption tank and means for filling and emptying said tank from and into the container and for diverting the expansate from the container and into said tank when distillation begins in the container.

My invention also consists in special constructions and in combinations of parts all as hereinafter described and particularly pointed out in the appended claims; and will be more readily understood by reference to the accompanying drawings, forming a part of this specification, and in which:—

Figure 1 is a diagrammatic sectional view of an apparatus embodying my invention in a preferred form. Figs. 2, 3, 4, 5 and 6 are similar diagrammatic explanatory views, with the container in transverse section, setting forth several operations which take place in the apparatus.

As shown in Fig. 1 the main container, which serves alternately as an absorber and a still, comprises two closed tanks or compartments A and B, occupying horizontal positions one above the other and connected by restricted and, preferably, siphonic passages or pipes $a$ and $b$. K is a cooling coil arranged in the upper compartment, and $k'$ is its regulating valve and $k^2$ the outlet. $d'$ is a pipe through which the flow or expansate from the refrigerating coil J enters the lower compartment. As shown the pipe $d'$ opens into the container at a point beneath the lower end of the fall duct $b$. L represents a fuel burner (of which $l'$ is the regulating valve) used for heating the contents of the container. In lieu of a fuel burner I sometimes employ a steam coil S in the lower compartment. And to avoid loss of heat I inclose the lower part of the container in a casing or hood R, open to the air at the top and bottom. As shown a pipe F, provided with a pressure and vacuum gage $f$, leads from the top of the container and serves to deliver the distillate to the condenser E, the coil whereof is shown in dotted lines. $f'$ is a shunt off or back check valve in the pipe F. $e'$ and $e^2$ are the water supply and overflow pipes of the condenser. The condenser coil leads to the reservoir G, which has an outlet valve H. To this valve is connected the refrigerating element or coil J. $J^2$ is the expansion valve of the refrigerating coil. The expansate or return pipe $J'$ of the coil joins the pipe $d'$, as before intimated, a valve $d^3$ being interposed. C is the auxiliary absorption tank. The bottom of the tank C is connected with the container and with the return pipe $J'$ by a pipe $d$, containing a valve $d^4$. The upper part of the tank C is connected with the upper compartment of the container by a pipe $c$, containing a valve $c'$. M is a sight gage glass upon the upper part of the container; and $m'$, $m^2$, $m^3$ are indicating marks on the gage glass, which facilitate use of the apparatus.

The mark P as applied in the drawings indicates pressure; the mark V indicates a partial vacuum; the mark = indicates an open valve; and, the mark $x$ indicates a closed valve.

The diagrammatic drawings depict the several conditions, and the action, of the liquor in the connected tanks during operation. Thus Fig. 1 depicts the condition during the early part of the absorption period; Fig. 2 shows the condition near the end of the absorption period; Fig. 3 the condition midway of the distillation period; Fig. 4 the condition near the end of the distillation period, just before the creation of a vacuum in the container; Fig. 5 the condition after the vacuum is created and when the strong liquor from the auxiliary tank C has been discharged into the container; and, Fig. 6 the condition after the refilling of the auxiliary tank, when absorption is beginning in the main container, but before the valves $c'$ and $d^4$ have been closed.

In initially preparing this improved apparatus for use I preferably fill the container with aqua ammonia of about 30 Baumé and preferably exhaust the air from the system. In some cases I also partially fill the auxiliary tank C with clear water and put a small charge of anhydrous ammonia in the reservoir G, so that refrigeration may be initiated while the first distillation is going forward in the main container. The process may also be started by charging both the container and the auxiliary tank with clear water and the reservoir with anhydrous ammonia and proceeding with absorption in the container immediately after driving or exhausting the air from the system. After thus preparing the apparatus, it is used as follows: Starting with a body of strong aqua ammonia in the container A—B, I reduce it to a weak state by distillation, and liquefy the distillate, for use in the refrigerating coil J. I then withdraw a small quantity or portion of the weak liquor from the container and hold it in reserve in the auxiliary tank C. At that time I connect the refrigerating coil with the container, so that re-absorption may proceed therein. The liquor in the container ultimately again reaches a strong state through absorbing expansate and I then divert the flow from the container and into the auxiliary tank C. While the expansate is being cared for in this way, I again distil the contents of the container and liquefy the distillate as before. When this re-distillation is finished I disconnect the return or expansate pipe from the auxiliary tank and again join it to the container. At that time I exchange the then strong liquor in the auxiliary tank C for a fresh reserve of weak liquor from the container, so that the described operations may be repeated. And thus I bridge the usual gap between distillation and re-absorption in the container, and uninterruptedly conduct refrigeration in the coil. As explained hereinafter, I preferably accomplish the exchange of liquor automatically without using a pump or the like for that purpose. The return flow of expansate being substantially constant, it is obvious that the volume of liquor held in reserve must be proportioned to the time the container is out of use as an absorber. In other words, its size depends upon the time consumed in distilling the main body and preparing it to again receive the flow from the coil. If the distillation period is long the reserve must be correspondingly large. The reserve body is weak when first withdrawn from the container but it is strong at the time it is exchanged. The mixing of a large body of strong liquor with the weak liquor in the container would increase the strength of both the latter and the next body of reserve liquor and by thus reducing their absorptive capacity would, in the sum of efficiency, practically negative the benefits of continuity. Therefore my invention includes means by which I reduce to a minimum the period during which the flow from the coil is excluded from the container, and by which I am enabled to carry on refrigeration continuously by the aid of a reserve body so small that its return to the main body does not materially diminish the absorptive capacity thereof.

In operating the apparatus, by means of the burner L or the steam coil S or both, I rapidly force the temperature in the container to a point where substantially complete distillation is accomplished in a minimum of time, and then at once create a vacuum in the container. As hereinafter explained I prefer to create this vacuum by means of the cooling coil K and by restricting the flow between the compartments A and B, as by the pipes $a$, $b$, rather than by a vacuum pump or the like. The vacuum marks the end of the distillation period for immediately thereafter and while the weak liquor is still hot, though somewhat below steaming temperature, I turn the expansate into the container, and also recharge the auxiliary tank with liquor. All this I accomplish in about one fourth the time which usually elapses between the moment of applying heat to the container and the resumption of absorption therein, and thus I make it possible to successfully bridge this gap with a very small reserve or auxiliary body of weak liquor.

Though my apparatus admits of the making and use of anhydrous ammonia I preferably make no effort to exclude water from the liquid distillate in the reservoir G, for to do so would increase the cost and lessen the quantity and the rate of distillation, but on the contrary I rapidly force distillation until a considerable quantity of water is driven off along with practically all the ammonia in the liquor. Thus I avoid the usually observed limitations upon distillation and secure a maximum of distillate in a minimum of time, the distillate being a liquid solution comprising a major part of ammonia and a minor part of water. I think there should always be at least five per cent. of water in the solution, but beyond that the proportions may be varied within considerable limits, and thus far I have secured the best results with ammoniacal liquids containing from twenty to twenty-four per cent. of water. I call the hydrous liquid here described "wet ammonia" to distinguish it from the "dry" or anhydrous liquids in general use. When expanded from a pressure which equals or exceeds the inherent pressure of its liquid content, this "wet" ammonia has a refrigerating effect exceeding that of an equal measure of "dry" ammonia. The most successful use of this wet resultant of the speedy distillation best suited to the success of the gap-bridging reserve is in turn dependent upon the creation and maintenance of the above described vacuum upon the weak liquor. As stated, I prefer to begin with 30 Baumé aqua ammonia, if need be enriching aqua ammonia with anhydrous ammonia, to secure that degree of saturation. I usually continue distillation until the liquor retains not more than five per cent. of ammonia. Re-absorption of ammonia usually restores the liquor to 30 Baumé condition. These fluctuations, from strong to weak and from weak to strong, are repeated in each cycle of operations. Weak liquor swells or increases in volume from the addition of expansate, whereas the driving off of ammonia gas and water vapor from a quantity of strong liquor reduces its volume. Hence, the volume of the liquor in the container varies at different stages of the operation. This is also true of the liquor in the auxiliary tank. Thus Fig. 2 shows the relative volumes at the time that re-absorption ceases in the container; Fig. 4 the relative volumes at the end of the distillation period before the exchange is made; and Fig. 6 the condition after the exchange. Intermediate stages are depicted in Figs. 3 and 5.

As depicted in Fig. 1, the container holds weak liquor and is receiving expansate from the coil J. The valves $f'$, $c'$, $d^4$ are closed. The valves $d^3$, H and $J^2$ are open. The valves $k'$ and $l'$ are closed because neither cold nor heat are required in the container during the absorption stage. There is a nearly complete vacuum in the top of the container, the vacuum having been obtained, preferably, in the manner hereinafter described. Throughout this stage the auxiliary tank C contains a quantity of weak liquor and a vacuum, previously derived from the main container. Absorption continues under these conditions until the liquor in the container is restored to a state of saturation and has increased to a volume which nearly fills the container. The vacuum in the container is sometimes but not always completely destroyed when this stage is reached. The conditions at the end of the absorption period are well depicted in Fig. 2. When the liquor in the main container is substantially saturated a continued flow of expansate would only build up a back pressure in the container and reduce the efficiency of the system. At that time, therefore, I close the valve $d^3$ and open the valve $d^4$, thus cutting off the container and diverting the expansate into the auxiliary tank C. Then I make a fire beneath the container, or heat its contents by the steam coil S. Ammonia gas begins to evolve or distil from the strong liquor at a very low temperature; about 60 degrees Fahr. in the case of 30 Baumé aqua ammonia; and a pressure is quickly built up in the container.

When the pressure exceeds ninety pounds I open the valve $f'$ and permit the gas to flow into the condenser E, in which meantime the flow of cooling water has been started. Under such pressure the gas liquefies in the condenser. The liquefied ammonia is collected in the reservoir G. When the standing pressure in the reservoir is high, the opening of the valve $f'$ is delayed until the pressure in the container equals that in the reservoir. As ammonia leaves the liquid in the container, higher temperatures are required to drive off the remainder; and obviously these higher temperatures are automatically obtained by continuing the fire under the container. I employ heat ample to raise the temperature rapidly, and expedite ammonia distillation without regard to temperatures that will generate steam from the water. The only limitations upon the heating of the container are those of economy, to prevent waste of heat, and the capacity of a condenser, proportioned to prevent an excessive accumulation of pressure in the container.

It is to be understood that a pressure of 90 to 250 pounds may exist in the container during the several stages of distillation; and that most of the ammonia is driven off before the liquor is hot enough to generate steam, at the pressure attained. But even after that temperature is reached I continue the heat for the purpose of driving off all but a small residue of ammonia and at the same time driving off a quantity of steam or water vapor. The gas and the vapor both pass to the condenser and are there liquefied. In this manner I almost wholly rid the liquor of ammonia and thus put it in the best possible condition to absorb ammonia. In doing so, I take from the contents of the container and store in the reservoir G under the pressure of condensation, substantially the maximum of ammonia that may be obtained from the given quantity of 30 Baumé aqua ammonia; the liquid condensate containing upward of twenty per cent. of water. Having done this I extinguish the fire beneath the container and close the distillate valve $f'$. It will be remembered that at this time the coil J is still discharging into the tank C and not into the container.

As soon as the heat is cut off and the valve $f'$ closed, and while the weak liquor in the container is still hot, I create a nearly complete vacuum in the container. For this purpose I employ the contents of the container in conjunction with a flow of cold water in the cooling coil K. At that moment very little liquid remains in the upper compartment, but it is filled with hot distillate, of which, if my observation be correct, water is the chief constituent. And it follows that, as it is chilled by the cooling coil, condensation ensues and the pressure in the container is rapidly reduced. In practice the drop of pressure from, say, two hundred pounds to atmospheric pressure is accomplished in approximately five minutes; i. e. condensation continues until the hot liquor ceases to give off steam under the reduced temperature. The sudden drop of temperature liquefies much of the ammonia gas and all of the water vapor. The removal of the gas is doubtless also aided by the absorption thereof by the cooled water of condensation. That is, much of the ammonia is thrown down with the water. It appears, however, that not all of the gas is removed in this way, for after the pressure drops to about zero there follows a violent surging of the liquor through the circulation pipes, $a$ and $b$, and the liquor repeatedly dashes through, and rises nearly to the top of, the upper compartment. The surging is undoubtedly due to the sudden relief of pressure in the upper compartment and the momentarily higher pressure and density of the liquor in the lower compartment which cause the liquor to surge through the restricted passage or passages between the compartments. The surging of the liquor diminishingly continues five to ten minutes, at the end of which time the liquor resumes a substantially quiet state; and it is found that approximately a thirty inch vacuum has been created in the upper compartment. The exhausting of the residue of ammonia gas from the upper compartment is doubtless due to the described agitation of the weak liquor in the upper compartment, it being clear that under such circumstances the weak liquor quickly absorbs and retains the ammonia gas. It might be expected that the weak liquor when relieved of pressure in this manner would give up its ammonia and destroy the void instead of taking on more ammonia, but this is not the case for the quantity of ammonia in the weak liquor is very small, and though the liquor is at that time hot, its tension or affinity for ammonia is greater than that of the void in the top of the container. Therefore, when once the vacuum is established and the liquor conditioned as above described, I stop the flow of water in the cooling coil K, and, opening the valve $d^3$, allow expansate to again enter the container; all within ten to twenty minutes after the heat is shut off and hours before the liquor would cool to the point usually regarded as essential to effective absorption of ammonia. Immediately upon resuming absorption in the container I exchange the then strong liquor in the tank C for a fresh reserve of the weak liquor from the container. Instead of using a pump for this purpose I preferably take advantage of conditions existing in the two containers at the moment. The addition of expansate to the auxiliary body of liquid during the distillation period is sufficient to considerably increase its volume as well as its strength. This condition is indicated in Fig. 4. The increase of volume reduces or destroys the vacuum and sometimes ultimates in a back pressure in the auxiliary tank. Therefore after the vacuum is formed in the container a marked difference in pressure exists between the auxiliary tank and the container and when the valve $d^3$ is opened to admit expansate to the latter, and the valve $d^4$ being still open, the contents of the tank C is forcibly discharged into the container through the pipe $d'$. This liquor is relatively cool and serves to somewhat reduce the temperature of the main body of liquor in the container, and being of relatively small volume the addition of ammonia from the auxiliary tank does not materially increase the strength of the larger body. The emptying of the auxiliary tank and the momentary addition to the volume of liquid in the container may be clearly understood on comparison of Figs. 4 and 5. Upon the emptying of the auxiliary tank I open the valve $c'$ in the pipe $c$ whereupon pressure conditions are equalized in the connected tanks and weak liquor from the container flows into the auxiliary tank, corresponding levels being established. I then close the valves $c'$ and $d^4$ and thus shut off the auxiliary tank from both the container and the refrigerating coil. Obviously the auxiliary tank is thus filled with hot weak liquor under a vacuum, and by the cooling of the liquor while waiting to be used, the vacuum in the tank is somewhat increased.

My purpose in placing the equalizing pipe $c$ below the top of the tank C, is to prevent the complete filling of the auxiliary tank at the moment of equalization and to thus leave room for liquid expansion, as indicated in Figs. 2 and 4. The auxiliary tank may best occupy a vertical position near the upper part of the container, but if care be used in operation it may be placed below the container, suitable arrangement being always made to discharge the liquor from its bottom. The interchange may be performed in various ways and good results may even be secured when the equalizing pipe $c$ is dispensed with or is connected with the lower part of the container.

The absorption of expansate in the container proceeds from the moment that the valve $d^3$ is opened until, after many hours in the case of apparatus of usual dimensions, the condition depicted in Fig. 2 is again attained and it again becomes necessary to distil the then strong liquor, whereupon the valve $d^3$ is closed and the valve $d^4$ open to again divert the expansate into the auxiliary tank and enable refrigeration to proceed uninterruptedly while a new distillation goes on in the container.

To avoid uncertainty in operation I calibrate the gage glass M, placing the marks $m'$, $m^2$ and $m^3$ at levels assumed by the liquid on termination of respective operations. Thus the mark $m^2$ indicates the end of the absorption period and the substantial destruction of the vacuum in the container. The mark $m^3$, when the liquid drops to that level, indicates the completion of distillation, i. e. the making of a full measure of condensate containing the proper proportions of ammonia and water. And the mark $m'$ indicates the emptying of the auxiliary tank. The fall of the liquid therefrom to the mark $m^3$ shows that the auxiliary tank has refilled, and that the valves $c'$ and $d^4$ may be closed.

Reverting to the cooling operation by which the vacuum is secured in the container, it is obvious that the weak liquor, if any, in the bottom of the upper compartment will be somewhat reduced in temperature by the cooling coil but that, following the described surging of the liquid in the container and the shutting off of the water from the coil, the temperatures are substantially the same in the two compartments of the container; however, a slight circulation continues through the siphonic ducts. And this circulation is resumed or augmented whenever the lower is hotter than the upper compartment; as from the more rapid radiation of heat from the upper or an increment of heat in the lower compartment. The circulatory exchange of cooler for warmer liquor tends to keep that in the lower compartment in highly absorptive condition.

Referring to Fig. 1 it will be seen that the down pipe $b$ delivers the cooler liquid from the upper compartment upon the stream of expansate entering through the pipe $d'$ and that to escape from the compartment A the expansate bubbles are compelled to move through the whole length of the compartment before reaching the up flow pipe $a$; this insures complete absorption.

When the described solution under pressure is permitted to escape from the reservoir G through an expansion valve $J^2$. it immediately vaporizes and expands within the refrigerating coil J. The constituent water of this solution, unlike liquid ammonia, would not expand at atmospheric pressure or against back pressure, but nevertheless the solution does expand effectively under the combined effect of its inherent pressure and the vacuum in either the container or the auxiliary. If my observation be correct, the solution expands as one body or substance and the initial expansate is a vapor of said solution. Proportionally, the expansion or evaporation of the constituent water is of greater effect than that of the constituent ammonia, and this enforced evaporation of the water under vacuum conditions, results in a proportionately greater absorption of heat. Thus I add material to the heat absorption and in all cases I secure as much or more refrigeration, pound for pound, from this wet ammonia than from anhydrous or dry ammonia.

Weak liquor under vacuum in either the container or the auxiliary tank has a great affinity for ammonia and in a similar sense an affinity for water vapor. Therefore the weak liquor takes up the expansate as rapidly as it enters from the refrigerating coil. Primarily the weak liquor, through the effect of contact, condensers and takes up the water vapor, and simultaneously absorbs the constituent ammonia, and thus both constituents of the expansate return together and are absorbed by the weak liquor, whether the same is hot or cold and whether or not there occurs a preliminary separation of the ammonia gas and water before the expansate reaches the weak liquor. Water under a vacuum is an unstable liquid and when once vaporized tends to retain its vaporous state; and any water which is condensed by the impact of the vapor upon the walls of the refrigerating coil is at once atomized or re-vaporized by the high velocity gases, which under a vacuum, move through the coil at great speed. From these facts it follows that very little of the water vapor separates or is condensed until it enters the weak liquor in the container.

The process here described involves an unusual and unexpected result in that both expanded anhydrous ammonia and the herein described aqueous expansate are readily absorbed by weak liquor at a temperature little below that at which it would steam. As before stated, I do not wait for the weak liquor to cool after distillation but turn the expansate into the container at once. In addition to the facts previously mentioned I find special explanation of the absorption of the aqueous expansate by hot liquor, in the fact that the constituent water vapor is of relatively larger volume than the constituent ammonia gas, and on entering into contact with the liquor is at once condensed and accelerates and insures absorption of the accompanying ammonia. And by the time saturation has proceeded to the point where the liquor would not take up ammonia at so high a temperature, radiation produces a temperature low enough to retain the absorptive capacity of the liquor. Obviously, the liquor (at any non-steaming temperature) will always absorb water.

I apprehend that the great success and high efficiency of the herein described process lies largely in the presence of so great a quantity of water vapor in the expansate that its condensation by the weak liquor stimulates, and maintains the effect of, a vacuum in the return pipe of the system. This joined to the effect of the vacuum above the liquor results in the maintenance of a vacuum condition that insures the effective expansion of both constituents of the wet ammonia in the coil.

After the reservoir is first charged the expansion valves H and $J^2$ are opened and thereafter remain open constantly or as long as refrigeration is required. This being understood the mechanical acts performed upon the described apparatus may be summarized as follows:— When the liquor shows at the mark $m^2$ of the gage glass, the valve $d^3$ is closed and the valve $d^4$ is opened, discontinuing absorption in the container and initiating it in the auxiliary tank. Then the burner is lighted, to heat the container. The water valve $e'$ is then opened, to cool the condenser. The valve $f'$, if automatic, opens when the pressure in the container balances that in the reservoir G; if not automatic the valve $f'$ is manually opened at a moment indicated by the gage $f$. When the liquor shows at the mark $m^3$ the fire is extinguished and the valve $f'$ closed. Then the water is turned into the coil K, by opening the valve $k'$. When the liquor rises in the gage glass and finally subsides, the water valve is closed, and immediately the valve $d^3$ is opened, to resume absorption in the container and permit the tank C to empty thereinto. This action is indicated by a rise of liquor to the mark $m'$ on the gage glass and thereupon the valve $c'$ is opened, to permit the tank C to refill. The refilling of the tank results in again lowering the liquor to the gage mark $m^3$ and thereupon the valves $d^4$ and $c'$ are closed, and absorption proceeds in the container until the liquor again rises to the gage mark $m^2$.

A marked advantage of the refrigerating system here described is that the aqua ammonia may be distilled as often as desired without interrupting refrigeration in the coil and therefore a container of very moderate size serves every purpose where the operator is present or where automatic means are provided to control the heat and operate the several valves.

Where the container is heated at frequent intervals I prefer to prolong the use of the cooling coil K, or to use the coil S (when provided with water connections, not shown) for cooling the liquor in the lower compartment immediately after the described surging operation, my purpose in so doing being to initially extract enough heat to insure a sufficiently low temperature at the time when the liquor is saturated by a relatively quicker return of the ammonia. Absorption may be prolonged in the auxiliary tank C by using a cooling coil therein, but I find this necessary only in installations that are called upon to supply disproportionately large refrigerating coils and in which distillation is very frequent.

I do not regard the two siphonic circulating pipes $a$ and $b$ as essential. They are useful and preferred, but in many cases I secure the same results by means of a single duct or opening between the compartments, and in still other cases I use a plurality of ducts, opening all thereof during distillation and closing some of them at the moment of cooling the upper compartment and during re-absorption.

One advantage of my invention is that the several operations are accomplished without the aid of power actuated pumps, compressors or the like; nevertheless it is evident that, though not so desirable, a pump may be employed when desired for emptying and refilling the auxiliary tank, and in large systems a vacuum pump may be employed in connection with either or both the container and the auxiliary tank.

It will now be clear that all of the objects set forth in the opening of this specification are attained in my invention; chiefly, by the use of the auxiliary tank and the means for creating and maintaining a vacuum over the hot liquor in the container. The results of my invention are, continuous refrigeration; more refrigeration from a given quantity of liquor; a greater quantity of distillate from each operation; fewer distillations; simplified and briefer operations; the avoidance of the common objections to water in the refrigerating coil; the elimination of the losses commonly associated with the dehydration of ammonia; and, the avoidance of the need for duplicate apparatus.

While I have illustrated and described my invention in accordance with the requirements of the patent statutes, I desire it to be understood that the details of construction may be materially varied and that various changes, modifications and substitutions may be made in the apparatus illustrated without departing from the spirit and scope of my invention as set forth in the appended claims.

This application is a continuation of an application, Serial No. 770,004, which I filed May 26, 1913, and now abandon in favor of this application.

The herein described process is not claimed in this application but is both described and claimed in a companion application of even date herewith.

Having thus described my invention I claim as new and desire to secure by Letters Patent:

1. In an ammonia absorption refrigerating apparatus, a container comprising upper and lower closed compartments which are in restricted siphonic circulatory connection, in combination with a heater, means for creating a substantial vacuum in the upper part of the container, an auxiliary closed tank, means for filling and emptying said tank from and into the lower part of said container and for directing expansate into either said container or said tank.

2. In an ammonia absorption refrigerating apparatus, a container comprising upper and lower closed compartments which are in restricted connection, in combination with a heater, means for creating a substantial vacuum in the upper part of the container, an auxiliary closed tank, means for filling and emptying said tank from and into the lower part of said container and for directing expansate into either said container or said tank.

3. In an ammonia absorption refrigerating apparatus, a container comprising upper and lower closed compartments in restricted connection, in combination with a heater for the container, a cooling coil in the upper compartment thereof, an auxiliary closed tank, means for filling and emptying said tank from and into the lower part of said container and for directing expansate into either said container or said tank.

4. In an ammonia absorption refrigerating apparatus, a container comprising upper and lower closed compartments in restricted siphonic connection, in combination with a heating coil in the lower compartment, means to suddenly cool the contents of the upper compartment to create a substantial vacuum therein, an auxiliary closed tank, means for filling and emptying said tank from and into the lower part of said container and for directing expansate into either said container or said tank.

5. In an ammonia absorption refrigerating apparatus, a container comprising upper and lower closed compartments which are in restricted connection, in combination with a heating coil in the lower compartment, a cooling coil in the upper compartment, an auxiliary closed tank, means for filling and emptying said tank from and into the lower part of said container and for directing expansate into either said container or said tank.

6. In an ammonia absorption refrigerating apparatus, a container comprising upper and lower compartments in restricted connection, in combination with a heater therefor and cooling means in the upper compartment thereof, for the purposes described.

7. In an ammonia absorption refrigerating apparatus, a container comprising upper and lower compartments in restricted connection, in combination with a heater therefor and a valved cooling coil in the upper compartment thereof, for the purposes described.

8. In an ammonia absorption refrigerating apparatus, a container comprising upper and lower compartments in restricted connection, in combination with a steam coil in the lower compartment, and a cooling coil in the upper compartment thereof, for the purposes described.

9. In an ammonia absorption refrigerating apparatus, a container comprising upper and lower horizontal tanks in restricted siphonic connection, in combination with a heater for the lower tank, a cooling coil in the upper tank, an auxiliary tank in valved connection with said container, a liquid level indicating gage for said container and auxiliary tank, a valved distillate outlet for said upper tank, and an expansate pipe in valved connection with said lower tank and said auxiliary tank.

10. In an ammonia absorption refrigerating apparatus, a container comprising upper and lower horizontal tanks in restricted connection, in combination with a heater therefor, cooling means in the upper tank, a vertical auxiliary tank in valved connection with said tanks, a valved distillate outlet for said upper tank, and an expansate pipe in valved connection with said lower tank and said auxiliary tank.

11. In an ammonia absorption refrigerating apparatus, a container comprising upper and lower compartments in restricted connection, in combination with a heater therefor, cooling means in the upper compartment thereof, a liquid level indicating gage upon the upper compartment, an auxiliary tank beside said container and in valved connection therewith, a valved distillate outlet for said upper compartment, and an expansate pipe in valved connection with said lower compartment and said tank.

12. In an ammonia absorption refrigerating apparatus, a container comprising upper and lower compartments in restricted connection, in combination with a heater therefor, cooling means in the upper compartment thereof, an indicating gage for the upper compartment, an auxiliary tank in valved connection with said container, a valved distillate outlet for said upper compartment, and an expansate pipe in valved connection with said lower compartment and said tank.

13. In an ammonia absorption refrigerating apparatus, a container comprising closed tanks one above the other, in combination with means connecting them for restricted siphonic circulation, a distillate outlet for the upper tank, an expansate inlet in the lower tank, and cooling means in said upper tank.

14. In an ammonia absorption refrigerating apparatus, a container comprising horizontal closed tanks one above the other, in combination with means connecting them for restricted siphonic circulation, a distillate outlet for the upper tank, a valved cooling coil in said upper tank, and an expansate inlet in the lower tank.

15. In an ammonia absorption refrigerating apparatus, a container comprising two horizontal closed tanks one above the other, in combination with means connecting them for restricted siphonic circulation, a heating coil in the lower compartment, a cooling coil in the upper compartment, a distillate outlet for said upper tank and an expansate inlet in said lower tank.

16. An ammonia absorption refrigerating system having a container which alternately serves as an absorber and as a still, in combination with means for establishing a substantial vacuum over the hot weak liquor when distillation ceases therein, a small auxiliary absorption tank and means for filling and emptying said tank from and into the container and for diverting the expansate from the container and into said tank when distillation begins in the container.

17. An ammonia absorption refrigerating system having a container which alternately serves as an absorber and as a still, in combination with means for cooling the upper part of said container and causing the liquor to surge therein to establish a substantial vacuum over the hot weak liquor when distillation ceases therein, a small auxiliary absorption tank and means for filling and emptying said tank from and into the container and for diverting the expansate from the container and into said tank when distillation begins in the container.

18. An ammonia absorption refrigerating system having a container which alternately serves as an absorber and as a still, in combination with a cooling coil in the upper part of the container for establishing a substantial vacuum therein, a small auxiliary absorption tank and means for filling and emptying said tank from and into the container and for diverting the expansate from the container and into said tank when distillation begins in the container.

19. An ammonia absorption refrigerating system having a container which alternately serves as an absorber and as a still, in combination with means for establishing a substantial vacuum over the hot weak liquor when distillation ceases therein, a small auxiliary absorption tank, means for filling said tank with liquor under vacuum from the container and for emptying the contents of said tank into the container and an expansate pipe in valved connection with the container and tank.

20. In an ammonia absorption refrigerating apparatus, a container comprising upper and lower horizontal closed tanks in restricted circulatory connection, in combination with a heater therefor; a heat retaining casing for the lower tank, a cooling coil in the upper tank, a valved distillate outlet for said upper tank, and a valved expansate pipe leading into said lower tank.

21. In an ammonia absorption refrigerating apparatus, a container comprising upper and lower horizontal closed tanks in restricted circulatory connection, in combination with a heater therefor, a heat retaining casing for said tanks, a cooling coil in the upper tank, a valved distillate outlet for said upper tank, a valved expansate pipe leading into said lower tank, and an auxiliary absorption tank outside said casing and in valved connection with said container and said pipe.

22. The container, the valved distillate pipe, the condenser, the reservoir, the expansion valve, the refrigerating element, and the valved expansate pipe of an ammonia absorption refrigerating system, in combination with an auxiliary tank in valved connection with said expansate pipe and the lower part of said container, for the purposes described.

23. The container, the valved distillate pipe, the condenser, the reservoir, the expansion valve, the refrigerating element, and the valved expansate pipe of an ammonia absorption refrigerating system, in combination with an auxiliary tank having its lower part in valved connection with said expansate pipe and the lower part of said container, for the purposes described.

24. The container, the valved distillate pipe, the condenser, the reservoir, the expansion valve, the refrigerating element, and valved expansate pipe of an ammonia absorption refrigerating system, in combination with an auxiliary tank having its lower part in valved connection with said expansate pipe and the lower part of said container and a valved equalizing connection between the upper parts of said tank and container, for the purposes described.

25. The container, the valved distillate pipe, the condenser, the reservoir, the expansion valve, the refrigerating element, and the expansate pipe of an ammonia absorption refrigerating system, in combination with an auxiliary tank connected to said expansate pipe, a valve in that connection and another valve in said pipe between said connection and the container, for the purposes described.

26. The container, the valved distillate pipe, the condenser, the reservoir, the expansion valve, the refrigerating element, and the expansate pipe of an ammonia absorption refrigerating system, in combination with an auxiliary tank connected to said expansate pipe, a valve in such connection, a valve in said expansate pipe between said connection and the container and a valved connection joining higher parts of said tank and container for the purposes described.

27. The container, the valved distillate pipe, the condenser, the reservoir, the expansion valve, the refrigerating element, and the expansate pipe of an ammonia absorption refrigerating system, in combination with a comparatively small auxiliary tank and means for directing the expansate from said expansate pipe either into the bottom of said container or into the bottom of said tank and for putting said container and tank into communication, for the purposes described.

28. The container, the valved distillate pipe, the condenser, the reservoir, the expansion valve, the refrigerating element, and the expansate pipe of an ammonia absorption refrigerating sysem, in combination with a comparatively small auxiliary tank, means for directing the expansate from said expansate pipe either into the bottom of said container or into the bottom of said tank and for putting said container and tank into communication, and a valved equalizing connection between an upper part of said tank and the container, for the purposes described.

29. The container, the valved distillate pipe, the condenser, the reservoir, the expansion valve, the refrigerating element, and the expansate pipe of an ammonia absorption refrigerating system constructed to maintain a partial vacuum in said container at the inception and during the re-absorption period, in combination with a closed auxiliary tank having its lower part in valved connection with said container and expansate pipe and a valved equalizing connection extending from a higher point in said tank to an upper part of said container, for the purposes described.

30. The container of an ammonia absorption refrigerating system, in combination with an expansate pipe leading into the lower part of said container, a valve therein, a relatively small auxiliary tank in valved connection with the container and said pipe, a valved equalizing connection between the tan and container and a gage which indicates the fluid action within and between said tank and container, for the purposes described.

31. In an ammonia absorption refrigerating system, a container comprising upper and lower closed tanks connected for siphonic submerged circulation and a heater therefor, in combination with a valved distillate pipe leading from the container, a relatively small auxiliary closed tank, an expansate pipe, means for directing expansate from the same either into the bottom of said container or into the bottom of said auxiliary tank and for putting said auxiliary tank and container in communication, and a valved equalizing connection between the higher parts of said auxiliary tank container, for the purposes described.

32. In an ammonia absorption refrigerating apparatus, a container comprising upper and lower horizontal tanks in combination with an up flow pipe connecting them at one end of the lower tank, a down flow pipe connecting said tanks at the other end of said lower tank and extending nearly to the bottom thereof and an expansate inlet opening into said lower tank substantially at the lower end of said down flow pipe.

In testimony whereof, I have hereunto set my hand, this 2nd day of March, 1914, in the presence of two subscribing witnesses.

WILLIAM J. KELLY.

Witnesses:
   CHARLES GILBERT HAWLEY,
   N. CURTIS LAMMONDE.